Sept. 8, 1970 J. D. SANTI 3,527,266
MAGNETO IGNITION SYSTEM, PARTICULARLY FOR SMALL ENGINES
Filed April 28, 1969 3 Sheets-Sheet 1

INVENTOR
John D. Santi
BY
ATTORNEY

INVENTOR
John D. Santi
BY
ATTORNEY

Sept. 8, 1970   J. D. SANTI   3,527,266
MAGNETO IGNITION SYSTEM, PARTICULARLY FOR SMALL ENGINES
Filed April 28, 1969   3 Sheets-Sheet 3

INVENTOR
John D. Santi
By
ATTORNEY

United States Patent Office 3,527,266
Patented Sept. 8, 1970

3,527,266
MAGNETO IGNITION SYSTEM, PARTICULARLY FOR SMALL ENGINES
John D. Santi, West Allis, Wis., assignor to Briggs & Stratton Corporation, Wauwatosa, Wis., a corporation of Delaware
Filed Apr. 28, 1969, Ser. No. 819,574
Int. Cl. F02p 1/00
U.S. Cl. 123—149                                    3 Claims

ABSTRACT OF THE DISCLOSURE

A magneto ignition system is provided with a magnetically actuated reed switch for controlling the magneto primary. Small shunt connected coils are wound around the switch and part of one core leg. At low engine speeds the switch is actuated mainly by leakage flux from the magneto energizing magnet; at high speeds the wave form of flux actuating the switch is brought by the coils nearly into coincidence with the reversing flux through the core. An arrangement for a battery ignition system is also disclosed.

---

This invention relates to ignition systems for reciprocating internal combustion engines, and more particularly to an automatic spark advance that is suitable for small single-cylinder engines.

In both battery and magneto ignition systems for internal combustion engines, spark plug firing is effected by closing a circuit shortly before firing of the plug is to occur, and then opening the circuit at the instant the plug is to be fired. Conventionally the circuit is closed and opened by means of breaker points which are actuated by a cam that is rotatably driven from the engine crankshaft.

When an engine is being started, the sparkplug should be fired relatively late in the cycle, near the beginning of the combustion stroke, in order to avoid kickback or reverse rotation of the engine against the thrust imparted to the crankshaft by the starting mechanism. When the engine idles or runs a slow speed, sparkplug firing should also occur fairly late in the cycle, to insure smooth operation and high torque. As the engine comes into its higher speed range, however, the time of plug firing should be advanced, that is, the plug should be fired well before the beginning of the combustion stroke, in order to obtain optimum performance from the engine. The earlier plug firing at high speeds compensates for the time required for combustion pressure to develop in the cylinder after the plug is fired, insuring that therewill be pressure on the piston as soon as it begins its downward motion.

For optimum starting and performance characteristics, therefore, an engine should be provided with some sort of arrangement for varying the time of sparkplug firing relative to the engine cycle, whereby the spark is retarded when the engine is being started and is advanced when the engine is running at high speed.

The most primitive form of mechanism for this purpose and the simplest one heretofore available, was a manually actuatable spark advance, comprising a movable mounting for the breaker points whereby they could be bodily shifted through a limited arc concentric to the cam which actuated them. For most purposes, however, a manually operated spark control is undesirable on an engine because it complicates management of the engine and more especially because it is likely to be misused with the result that it achieves more harm than good.

Automatic spark advance mechanisms have been devised and have come into almost universal use on larger and more complicated engines, such as those for automobiles. Heretofore, however, no satisfactory automatic spark advance has been devised that is simple, compact and inexpensive enough to be completely suitable for the small single-cylinder engines that are widely used for powering lawn mowers, small garden tractors, sump pumps and the like. Most such engines therefore have a fixed spark, usually timed to afford relatively good high speed performance at some sacrifice of ease of starting.

By contrast it is the general object of the present invention to provide an automatic spark advance arrangement which is extremely low in cost and so simple and compact that it can be readily incorporated into small single-cylinder engines without requiring material redesign of the affected parts thereof, and which embodies no moving parts that are in contact with one another and therefore poses no problems of lubrication or frictional wear.

Another and more specific object of this invention is to provide an automatic spark advance which is actuated solely by electromagnetic means and which is suitable for both battery ignition systems and magneto ignition systems.

It is also a specific object of this invention to provide an automatic spark advance which is particularly well adapted for magneto ignition systems such as are commonly used in small single-cylinder engines, in that the spark advance of this invention comprises merely a pair of small coils and a magnetically actuatable switch unit, such as a reed switch, that can cooperate with the permanent magnet means conventionally present in such ignition systems, often on the engine flywheel.

Wtih these observations and objects in mind, the manner in which the invention achieves its purpose will be appreciated from the following description and the accompanying drawings. This disclosure is intended merely to exemplify the invention. The invention is not limited to the particular structure or method disclosed, and changes can be made therein which lie within the scope of the appended claims without departing from the invention.

The drawing illustrates one complete example of the physical embodiment of the invention constructed according to the best mode so far devised for the practical application of the principles thereof, and in which.

Figure 1:
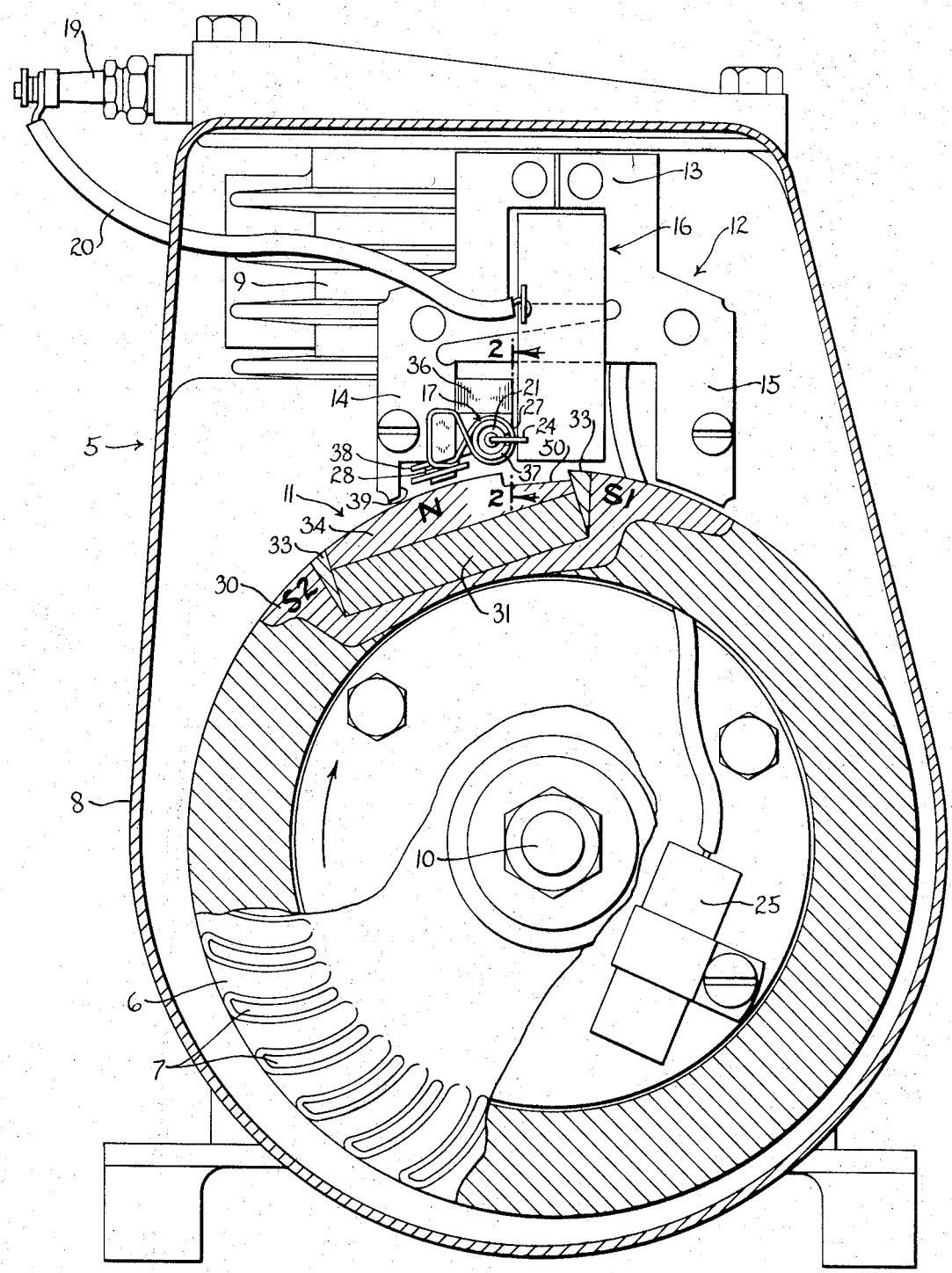
FIG. 1 is a view partly in elevation and partly in section of a single-cylinder engine having a flywheel magneto and embodying the principles of this invention.
Figure 2:
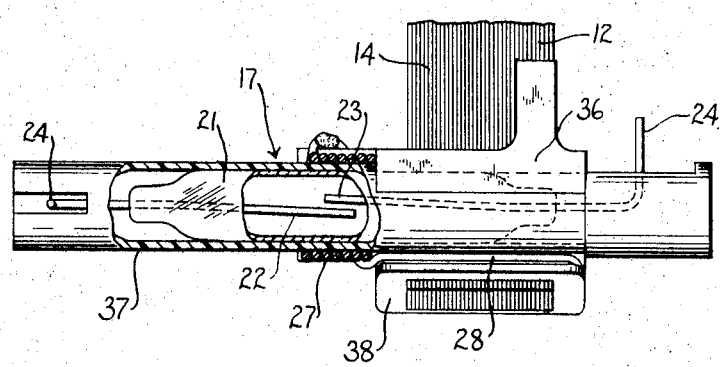
FIG. 2 is a sectional view taken on the plane of the line 2—2 in FIG. 1.

The invention will first be considered as incorporated in a magneto ignition system for a single-cylinder engine 5, as illustrated in FIGS. 1 and 2.

The engine 5 has a flywheel 6 that can be made as an aluminum casting and can be provided with vanes 7 whereby cooling air is forced through a shroud 8 that surrounds the engine cylinder 9. The flywheel is secured to the crankshaft 10 of the engine to rotate therewith, and in addition to serving as a blower it also functions as a carrier for a permanent magnet element 11 by which the magneto ignition system is energized. The magnet element is fixed in the rim portion of the flywheel, and therefore its orbital motion as the flywheel rotates is in timed relation to crankshaft rotation and is thus synchronized with the engine cycle.

The magneto ignition system also comprises a generally U-shaped magnetically permeable core 12 that is fixed on the engine adjacent to the flywheel, with its legs 14 and 15 projecting toward the magnet orbit. The core 12 is embraced by windings 16 comprising a primary that has its terminals connected with magnetically actuatable switch means 17 and a secondary that has the conventional connection with a spark plug 19 by means of a high tension lead 20.

The magneto ignition system here shown is generally similar to that of Pat. No. 3,114,851, to J. D. Santi, particularly in that the core 12 is characterized by a flux shunt portion 13, the purpose of which is fully explained in that patent. However, the conventional cam actuated breaker points disclosed in that patent have here been replaced by the magnetically actuated switch means 17, which can be a reed switch unit.

As is well known, a reed switch comprises an elongated envelope 21 of glass tubing or the like, and a pair of magnetically permeable resiliently flexible reeds 22 and 23 that project lengthwise into the envelope from opposite sealed ends thereof. The inner tip portions of the reeds are in overlapping normally spaced apart relationship, to provide the switch contacts, and their opposite end portions project outwardly beyond the sealed ends of the envelope to provide terminals 24 for the switch that are connected with the terminals of the primary magnetic winding. When a magnetic flux is charged through the reeds, the attraction between their overlapping tip portions flexes them into circuit closing engagement, and as soon as the flux is removed the reeds of course spring back to their normal spaced apart relationship.

In either a magneto or a battery ignition system, the circuit that must be closed and opened to effect sparkplug firing is that of a primary winding, and in this case the switch unit 17, when closed, short circuits the magneto primary to allow current to flow therein, and upon opening interrupts current through the primary to thus cause a rapidly changing magnetic field to cut the secondary and induce a high voltage therein. The conventional capacitor 25 is shown connected across the switch terminals.

The switch unit 17 is actuated by the permanent magnet element 11 that is carried by the flywheel, and to this end the switch is mounted adjacent to the rim of the flywheel and is so positioned and oriented that the magnet element, as it moves through that portion of its orbit in which switch actuation is intended to occur, charges leakage flux into the switch. Hence the timing of actuation of the switch is generally a function of the rotational position of the flywheel. However, the timing of the buildup and decay of the constant polarity leakage flux that the magnet element charges into the switch is substantially modified by the automatic spark advance means of this invention, which comprises a first small coil 27 that surrounds the switch unit and a second small coil 28 that surrounds a portion of the core 12 to be in flux linking relationship therewith. The two coils 27 and 28 are connected in shunt with one another.

As will appear from the following explanation, the employment of the magnet element 11 of the magneto for actuation of the magnetic switch unit 17, and the arrangement of the second coil 28 of the spark advance mechanism on the same core 12 that serves the magneto windings 16, are matters of convenience and economy in a magneto ignition system.

Turning now to a more detailed consideration of the actuating apparatus for the switch means, the magnet element 11 comprises a substantially U-shaped soft iron pole shoe 30 and a rectangular block magnet 31 that is fixed between the legs of the pole shoe and has a flat inner pole face engaged with a flat surface on the bight portion of the pole shoe. As shown, the magnet element is so disposed in the rim portion of the flywheel that the legs of the pole shoe extend radially outwardly, and the lines of flux extending through the pole shoe legs and the block magnet 31 are radial to the flywheel.

The radially outermost face of the block magnet provides one of the poles N of the magnet element. The other two pole faces S1 and S2 of the magnet element, at the outer ends of the legs of the pole shoe, are circumferentially extended so that they remain effectively aligned through substantial angles of flywheel rotation, with the opposing pole faces on the core 12 provided by the end surfaces of its legs 14 and 15.

While the pole faces S1, N and S2 are shown peripheral to the flywheel, facing radially outwardly, it will be apparent that with a suitable reorientation of the core 12 and the switch unit, the magnet element could be arranged to have its poles facing in the direction of the flywheel axis. In any case, the magnet element provides two poles of like polarity with a pole of unlike polarity between them and its three poles lie along an orbitally extending line, all facing in the same direction relative to the axis of its orbit, so that the magnet element is adapted for charging a reversing flux through the core 12 as it swings past the legs of the core in the course of its orbital motion.

The bight portion of the pole shoe 30 is of such width that a slight space or gap 33 exists between each end of the block magnet and its opposing inner face of the adjacent pole shoe leg, which gap can be filled with aluminum that is integral with the main body of the flywheel casting. Preferably a soft iron pole piece 34 is placed over the radially outer face of the permanent block magnet to complement the curved peripheral surface of the flywheel and minimize the air gap between the magnet element and the pole faces of the core 12 at the ends of the legs 14 and 15 thereof.

The switch unit 17 must be so oriented that the magnetic path which it defines is generally transverse to the line along which the magnet element pole faces extend, so that it is never in spanning relationship to unlike pole faces of the magnet element as the latter swings past it. As shown, it is lengthwise parallel to the flywheel axis. Further, as shown, the gap between the overlapping tips of its reeds 22 and 23 should be located near to but slightly to one side of the orbit of the magnet element. By reason of this orientation of the switch, the magnet element charges flux into the switch only during that time in each orbit when the middle pole N of the magnet element is substantially in radial alignment with the switch, and there is no reversal of the polarity of that flux charge inasmuch as it is a leakage flux.

The positioning of the switch 17 in the orbital direction is also important. The switch is located between the legs 14 and 15 of the core 12 and in such spaced relation to the respective core legs that flux is charged into the core 12 before leakage flux begins to be charged into the switch, and reversal of polarity of the flux charged through the core occurs at a time shortly before termination of the magnet produced charge of leakage flux into the switch.

Figure 3:
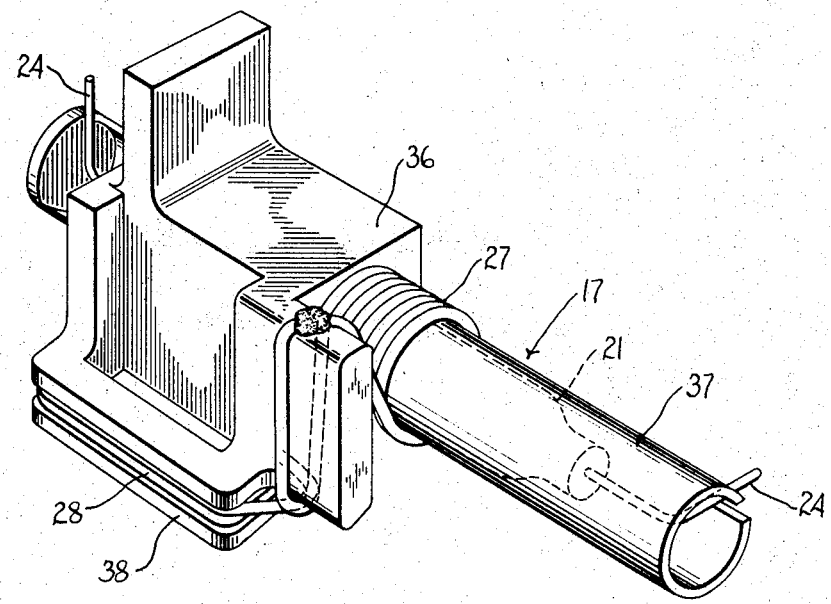
FIG. 3 is a perspective view of the coils and the holder for them.

To facilitate assembly of the apparatus and to hold the switch 17 and the two coils 27 and 28 in their proper places, these elements can be associated with a unitary nonmagnetic holder 36, preferably molded of a suitable plastic. The holder, which is best seen in FIG. 3, has a tubular portion 37 in which the switch unit is housed and around which the first coil 27 is wound, and a laterally projecting rectangular portion 38 around which is wound the second coil 28. For proper timing of the build-up of flux linked with the second coil, the leg 14 of the core that is first swept by the magnet element has a lengthwise extending slot 39 opening to its free end, and the rectangular portion 38 of the holder embraces the inner one of the bifurcations defined by this slot.

In a very general way it can be said that the function of the shunt connected coils 27 and 28 is to modify the wave form of the flux that acts upon the switch 17, and with increasing engine speed to bring that wave form more and more toward conformity with the wave form of the reversing flux that is charged into the core 12 by the magnet element.

Figure 5:
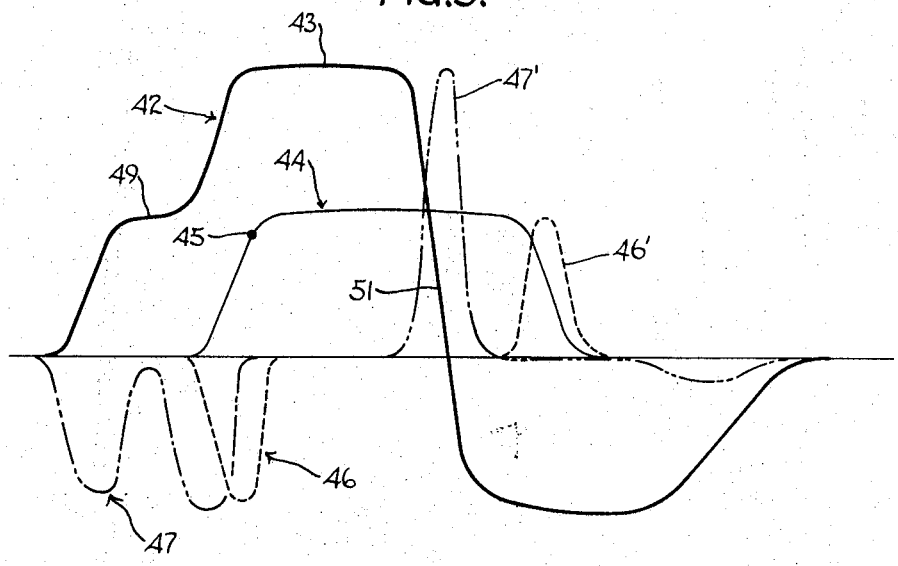
FIG. 5 is a graph showing the relationship between magnetic fluxes charged into the coils comprising the spark advance mechanism of this invention and the voltages induced in those coils.

Referring to FIG. 5, the curve 42 depicts the wave form of the flux charged into the core 12 by the magnet element, while the curve 44 depicts the waveform of the leakage flux charged through the switch unit as it would be in the absence of the small coils 27 and 28.

The curves 42 and 44 can be considered as depicting the respective flux wave forms that obtain at very low speeds of crankshaft rotation, because the rate of change of flux is small at very low crankshaft speeds, and therefore only negligible voltages are induced across the coils 27 and 28. At very low speeds, therefore, the switch unit closes when the buildup of leakage flux through it reaches a certain value, such as that designated by the point 45 on curve 44.

However, it must be borne in mind that an electromagnetic switch unit does not close instantaneously. When the magnetic actuating field reaches the level of the point 45, converging movement of the switch contacts begins, and there is a short delay interval before the contacts actually engage. The duration of that delay interval, which is mainly a characteristic of the particular switch means, is in any case short enough to be negligible at very low crankshaft speeds, but at the highest speeds it must be taken into account.

Note that the switch closes in the plateau portion 43 of the curve 42, during the time that the poles N and S1 of the magnet element are in substantial alignment with the legs 14 and 15, respectively, of the core, so that switch closure occurs when there is no change in flux through the magneto primary and therefore no voltage across it that could cause pitting and erosion of the switch contacts in the event they rebound slightly upon engagement.

At moderately slow crankshaft speeds the building flux linked with the second coil 28 induces a voltage thereacross which is depicted by the curve 47. At about the same time, the building leakage flux linked with the first coil 27 induces a voltage thereacross which is depicted by the curve 46. Those voltages are nearly in phase, and at moderately slow crankshaft speeds they are of nearly equal magnitude, as shown, and therefore only negligible current flows in the shunt connected coils, hence switch closure occurs at about the same time that it would if the coils 27 and 28 were not present.

With increasing engine speeds, the voltages across both coils 27 and 28 will increase in magnitude, but the resistances of the coils will of course remain constant. Therefore as the voltages increase across the coils, the voltage difference between them will also increase, and current will flow through them. The second coil 28 is more closely coupled with the magnet element, through the core 12, and has a smaller number of turns than the coil 27, which is linked with the weaker leakage flux represented by the curve 44. In consequence, the current flow through the coils 27 and 28 will have relatively insignificant effect upon the flux 42 charged through the core 12 by the magnet, but is capable of producing a substantial distortion of the leakage flux which is represented by curve 44 and which affects the switch means, causing the flux associated with the switch means to begin its buildup earlier in the cycle with increasing engine speeds, or; in effect, reshaping the curve 44 more and more towards conformity with the curve 42.

This is to say that at high engine speeds the flux acting upon the switch means has substantially the same wave form during its buildup as is depicted by the left-hand portion of the curve 42.

While it would seem from the appearance of curve 42 that at high engine speeds the switch might be closed before the plateau portion 43 of that curve is reached, and at a time when there is voltage across the magneto primary 16, that is not the case. In the first place, there must be a flux of some magnitude charged through the switch means before its contacts begin to converge, and specifically the flux associated with the switch must reach the level of point 45 on curve 44. Secondly, closure of the switch takes time. These two factors together account for a delay in actual closure of the switch means until the voltage across the primary is zero.

Before leaving the subject of how switch closing is controlled by the apparatus of this invention, it should be explained that the step at 49 in the curve 42 of magnet charged flux through the core is due to a notch-like relief 50 in the pole piece 34. That relief or notch serves to control the rate of rise of magnet charged flux through the core 12, and its geometry of course controls the shape of the left hand portion of curve 42. In general, the notch 50 should be so tailored that at low engine speeds the rate of buildup of flux charged through the core 12 is not great enough to induce a current in the coil 28 that can effect premature closure of the switch, i.e., closure at a time when flux is building through the magneto primary to induce a voltage thereacross.

Depending upon engine speed, the switch means should open during the reversal of polarity of the flux charged through the core 12, or shortly thereafter.

Upon reversal of polarity of the flux through the core 12, the rapid change of such flux induces a voltage 47' across the second coil 28, which voltage is impressed across the coil 27, due to the shunt connection between the coils 27 and 28. That voltage is generally a function of the portion 51 of curve 42 that crosses the base (zero) line in FIG. 5. Its magnitude of course varies with crankshaft speed, being rather small at very low speeds and relatively very high at top speed, and as impressed across the coil 27 it tends to cause flow of current therein in the direction to hasten the decay of the charge of leakage flux which is holding the switch closed and which is represented by the curve 44.

In considering what happens at switch opening, it must be borne in mind that the curve 44 represents the leakage flux that would be acting upon the switch in the absence of the coils 27 and 28. The curve 46' represents the voltage that would be induced in the coil 27 by the flux decay represented by the right hand portion of curve 44.

At low crankshaft speeds, the voltage 47' that is induced in the second coil 28 by the reversing magnet charged flux in the core 12 is not high enough, in relation to the total resistance of the coils 27 and 28, to drive any substantial current through them; and the voltage 46' is likewise too low to be of any significance. Hence at slow engine speeds the flux acting upon the switch through the time it opens is substantially that depicted by the right hand portion of the curve 44, and the switch opens at very nearly the same time that it would open if it were acted upon only by the leakage flux, in the absence of the coils 27 and 28.

As engine speeds increase, there is a complex interaction between the two flux fields and the two coils, which can be explained as follows. The voltage 47' that is induced in the second coil 28 by reversal of magnet charged flux through the core 12 increases with increasing crankshaft speed, and because the resistance of the coils 27 and 28 remains constant, there comes a point, as engine speed increases, at which the current through the coils has an appreciable effect in hastening decay of the flux holding the switch closed. In effect this amounts to a leftward shift of the right hand portion of curve 44. The decaying flux associated with the switch and linked with the first coil 27 induces a voltage across that coil which has some effect in retarding such decay. Again, however, the effect of the reversing magnet charged flux will predominate because the second coil 28, with its associated core 12, is closely linked with the powerful magnet charged flux field through the core, while the first coil 27, with the magnetic switch which comprises its core, is much less closely coupled to the magnet through the leakage flux field.

With increasing engine speed, therefore, the curve 46' moves farther and farther to the left until it is in phase with the voltage curve 47'. But because of the predominating effect of the voltage 47' induced in the second coil 28, the right hand portion of the leakage flux curve 44, in shifting leftward, comes more and more nearly into conformity with the curve 42 of magnet charged flux through the core; and therefore in the highest range of engine speeds the right hand portion of the curve 44 can be visualized as coinciding with the portion 51 of the curve 42 that intersects curve 44 and extends down to the zero line.

Of course the leftward movement of the right hand portion of curve 44 with increasing engine speeds causes the switch to open correspondingly earlier in the engine cycle.

Because the second coil 28 is closely coupled with the magnet element through the core 12, it should have substantially fewer turns than the first coil 27 in order to achieve proper balance of the voltages across the coils, that is, a proper relationship of their $L/R$ (inductance to resistance) ratios. Excellent results have been obtained with a first coil having 7 turns of No. 21 copper wire and a second coil having 2 turns of the same wire. With those coils in an arrangement like that illustrated in FIGS. 1, 2 and 3, there was obtained an effective change in spark timing of about 10° of crankshaft rotation as between normal cranking speeds and the maximum speed of the engine.

Figure 4:
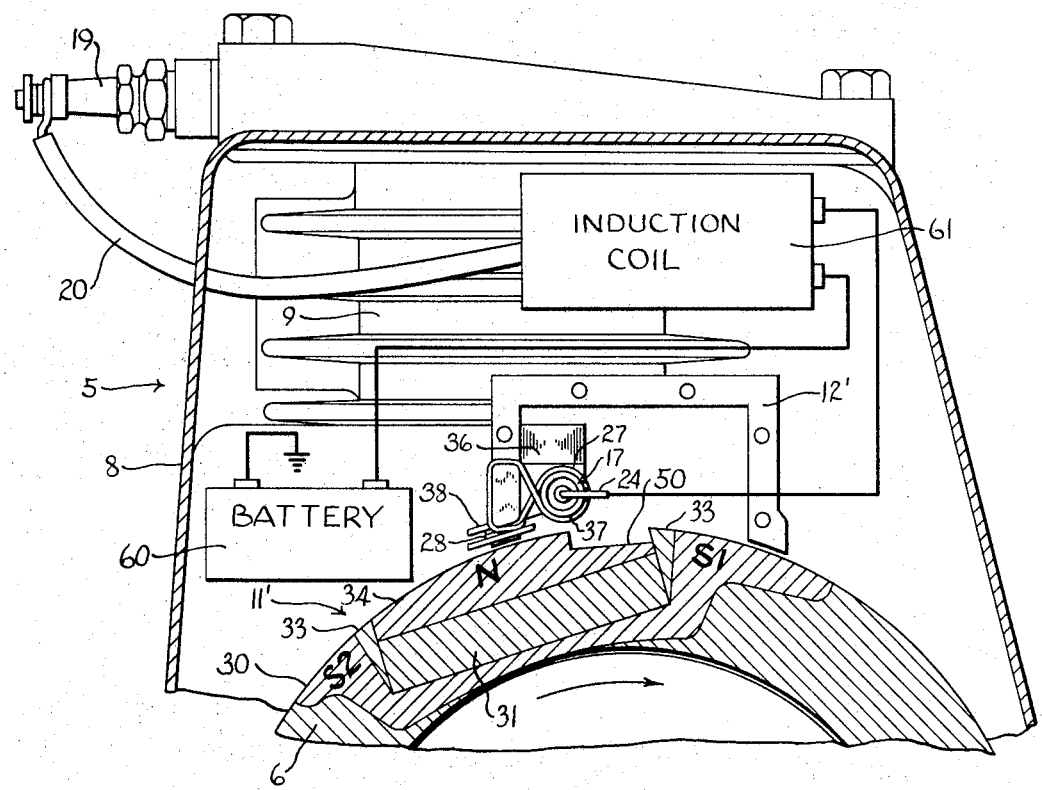
FIG. 4 is a fragmentary view generally similar to FIG. 1 but illustrating the principles of the invention embodied in an engine with a battery ignition system.

FIG. 4 illustrates the application of the principles of the invention to a battery ignition system for a single cylinder engine, wherein ignition energy is supplied by a battery 60 in cooperation with a conventional ignition coil 61, and wherein closing and opening of a magnetic switch unit 17 connected in the induction coil primary circuit is controlled by a permanent magnet element 11' on the engine flywheel 6. In this case the magnet element 11' serves only for switch actuation, and it could be made substantially smaller than in installations where it also serves to provide energy for magneto ignition. A core 12' mounted adjacent to the flywheel has the second small coil 28 wound around it and straddles the switch, around which is wound the coil 27. Obviously the core 12' can be substantially smaller than the core 12 in the first described embodiment of the invention.

The principles of switch actuation in the FIG. 4 embodiment are of course the same as those described in connection with the first described embodiment, although with a battery ignition system no special care need be taken to insure closure of the switch at a particular time (so long as it closes a little while before the plug is to be fired), inasmuch as there will always be a voltage across the induction coil primary when the switch closes.

From the foregoing description taken with the accompanying drawings it will be apparent that this invention provides a very simple, compact and inexpensive automatic spark advance apparatus having no moving parts that are in contact with one another and which is especially well suited for small single-cylinder engines.

What is claimed as my invention is:

1. In a reciprocating internal combustion engine ignition system having a circuit that must be closed and opened in timed relation to the engine cycle to effect firing of a spark plug, means for automatically causing said circuit to be opened earlier in the engine cycle at high speeds of crankshaft rotation than at low rotational speeds thereof, said means comprising:
   (A) magnet means connected with the crankshaft for motion in a defined orbit in timed relation to crankshaft rotation, said magnet means having a pair of like pole faces which are spaced apart in the orbital direction and which flank an unlike pole face, all of said pole faces being oriented in a common direction relative to the axis of the orbit;
   (B) a magnetically actuatable normally open switch unit connected in said circuit;
   (C) mounting means fixing the switch unit adjacent to said orbit and in such orientation that a wave of flux of constant polarity is charged through the switch unit by the magnet means as the same moves through its orbit;
   (D) an orbitally extending core fixed adjacent to said orbit and arranged to have a reversing polarity flux charged therethrough from said pole faces of the magnet means during orbital rotation thereof, with reversal of polarity occurring at a time while said wave of constant polarity flux is persisting; and
   (E) a pair of coils connected in shunt with one another,
      (1) one of said coils being fixed in flux linking relationship with the switch unit, and
      (2) the other of said coils being in flux linking relationship with said core so that change in the flux through the core induces a voltage across said other coil which is of a magnitude depending upon engine speed and which is impressed across said first coil to cause current flow therethrough at high engine speeds, whereby with increasing engine speed the waveform of the flux linked with the switch unit is caused to approximate more and more closely that of the flux charged through the core.

2. In a reciprocating internal combustion engine ignition system having a circuit that must be closed and opened in timed relation to the engine cycle to effect firing of a spark plug, means for automatically causing said circuit to be opened earlier in the engine cycle at high speeds of crankshaft rotation than at low speeds thereof, said means comprising:
   (A) magnet means connected with the crankshaft for motion in a defined orbit in timed relation to crankshaft rotation, said magnet means having three pole faces which are of alternating polarity along a line in the orbital direction and which all face in the same direction relative to the orbit axis;
   (B) a magnetically actuatable normally open switch unit connected in said circuit;
   (C) mounting means fixing the switch unit adjacent to said orbit, with the magnetic path of the switch unit transverse to said line so that a nonreversing flux builds and decays through the switch unit during each orbital revolution of the magnet means as the middle pole face moves through juxtaposition to the switch unit;
   (D) a permeable core mounted in a fixed position adjacent to said orbit and having a pair of pole faces which are spaced apart in the orbital direction and through which a reversing flux is charged by said magnet means during a portion of each revolution thereof, said core being so located in the orbital direction that flux reversal therethrough occurs while said nonreversing flux is being charged through the switch unit;
   (E) first and second coils connected in shunt with one another,
      (1) the first coil being fixed in flux linking relationship with the switch unit, and
      (2) the second coil being in flux linking relationship with said core to have a voltage induced thereacross by change of flux in the core which varies in magnitude with the speed of crankshaft rotation, and which is impressed across the first coil, the inductance to resistance ratios of said coils being in such relation to one another that at high engine speeds the flux linked with the switch unit has substantially the same wave form as the flux linked with the core.

3. In a reciprocating internal combustion engine ignition system having a circuit that must be closed and opened in timed relation to the engine cycle to effect firing of a spark plug, means for automatically causing said circuit to be opened earlier in the engine cycle at high crankshaft speeds than at low ones, said means comprising:

(A) magnet means connected with the crankshaft for motion in a defined orbit in timed relation to crankshaft rotation, said magnet means providing three pole faces which are of alternating polarity along a line in the orbital direction and which all face in the same direction relative to the orbit axis;

(B) a magnetically actuatable normally open switch unit connected in said circuit and defining an elongated magnetic path;

(C) mounting means fixing the switch unit adjacent to said orbit with the magnetic path of the switch unit transverse to said line so that a nonreversing flux builds and decays through the switch unit during each orbital revolution of the magnet means as the middle pole face moves orbitally through juxtaposition to the switch unit, the decay of said flux being timed to coincide with the time of switch opening desired at low engine speed;

(D) a first coil surrounding the switch unit and having its axis substantially coinciding with said magnetic path;

(E) a magnetically permeable core mounted in a fixed position adjacent to said orbit and having a pair of pole faces which are spaced apart in the orbital direction and through which a reversing flux is charged by said magnet means during a portion of each revolution thereof, said core being so located in the orbital direction that flux reversal therethrough occurs while said nonreversing flux is being charged through the switch unit; and (F) a second coil connected in shunt with the first coil and arranged in flux linking relationship with said core so that during flux reversal through the core a voltage is induced across the second coil of a magnitude dependent upon the speed of crankshaft rotation, and which voltage, being impressed across the first coil, is effective in proportion to its magnitude to hasten decay of said nonreversing flux.

References Cited
UNITED STATES PATENTS

| | | | |
|---|---|---|---|
| 2,117,018 | 5/1938 | Conrad | 310—169 |
| 2,446,761 | 8/1948 | Harmon | 310—153 |
| 3,192,439 | 6/1965 | Shaw | 310—153 |
| 3,278,775 | 10/1966 | Eberline | 310—153 |
| 3,324,841 | 6/1967 | Kebbon | 123—149 |

MILTON O. HIRSHFIELD, Primary Examiner

R. SKUDY, Assistant Examiner

U.S. Cl. X.R.

123—148; 310—70, 153